(12) United States Patent
Schick

(10) Patent No.: US 9,637,098 B2
(45) Date of Patent: May 2, 2017

(54) VEHICLE BRAKE SYSTEM

(71) Applicant: Deere & Company, Moline, IL (US)

(72) Inventor: Troy E. Schick, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 120 days.

(21) Appl. No.: 14/798,804

(22) Filed: Jul. 14, 2015

(65) Prior Publication Data

US 2017/0015289 A1  Jan. 19, 2017

(51) Int. Cl.

| | |
|---|---|
| B60T 13/00 | (2006.01) |
| B60T 8/32 | (2006.01) |
| B60T 7/12 | (2006.01) |
| B60T 8/171 | (2006.01) |
| B60T 8/1755 | (2006.01) |
| B60T 11/28 | (2006.01) |
| B60T 15/02 | (2006.01) |

(52) U.S. Cl.
CPC  B60T 8/32 (2013.01); B60T 7/12 (2013.01); B60T 8/171 (2013.01); B60T 8/1755 (2013.01); B60T 11/28 (2013.01); B60T 15/028 (2013.01)

(58) Field of Classification Search
CPC ..... B60T 8/32; B60T 7/12; B60T 7/04; B60T 8/171; B60T 8/1755; B60T 11/28; B60T 11/21; B60T 13/64; B60T 15/028; B62D 11/18
USPC .... 303/9.61, 9.62, 119.1, 146, 147; 180/6.2, 180/333
See application file for complete search history.

(56) References Cited

U.S. PATENT DOCUMENTS

| | | | | |
|---|---|---|---|---|
| 3,530,951 | A * | 9/1970 | Beig | B62D 1/22 180/333 |
| 4,583,788 | A * | 4/1986 | Rubenstein | B60T 13/10 180/6.2 |
| 9,290,167 | B2 * | 3/2016 | Schick | B60T 7/042 |
| 2009/0001805 | A1 * | 1/2009 | Schick | B60T 7/042 303/9.61 |
| 2013/0038118 | A1 * | 2/2013 | Brinkley | B62D 11/08 303/9.62 |
| 2013/0127239 | A1 * | 5/2013 | Brenninger | B60T 11/21 303/9.61 |
| 2016/0039399 | A1 * | 2/2016 | Schick | B60T 7/042 303/9.61 |

* cited by examiner

*Primary Examiner* — Pamela Rodriguez

(57) ABSTRACT

A brake control system is provided for a vehicle having steerable front wheels, left and right brake units for braking left and right rear wheels, and a single manually operated brake input device. A main brake valve has a supply port, a return port, an outlet and a valve spool for controlling communication therebetween. The valve spool is coupled to a brake input device. A normally open left turn valve controls communication between the outlet and the left brake unit. A normally open right turn valve controls communication between the outlet and the right brake unit. A normally open balance valve controls communication between the left and right brake units. The system includes a brake input device sensor, a turn angle sensor and a vehicle speed sensor. A control unit controls the left and right turn valves and the balance valve as a function of signals from the sensors.

14 Claims, 1 Drawing Sheet

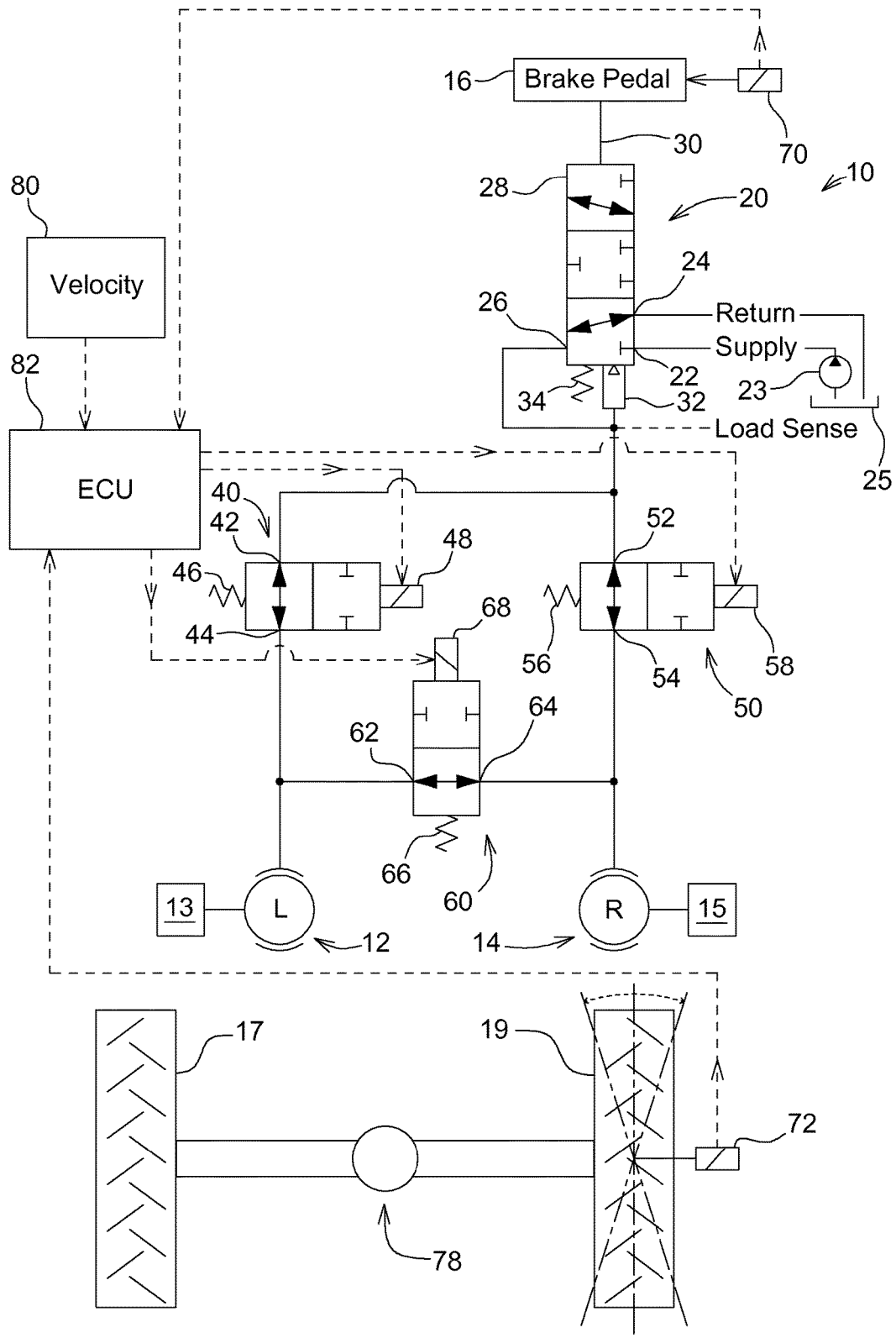

VEHICLE BRAKE SYSTEM

FIELD OF THE INVENTION

The present disclosure relates to a vehicle brake system.

BACKGROUND OF THE INVENTION

Certain agricultural tractor brake systems have separate left and right brake pedals, so that the brakes can assist in turning the tractor when operating at low off-road speeds. When such a tractor is operated on-road at higher speeds, the brake pedals must be manually locked together to insure that the left and right brake pressures are balanced. If an operator forgets to lock the pedals together, the operator may lose control of the tractor and implement when braking at higher on-road speeds, because the tractor will pull to the side with the highest brake pressure. A single brake pedal can be used to obtain equal left and right brake pressure. But, using a single brake pedal prohibits differential braking during tight slow speed headland turns. It is desired to have single pedal braking system for an ag tractor which provides differential braking at lower field speeds and which disables differential braking at transport speeds.

SUMMARY

According to an aspect of the present disclosure, a brake control system is provided for a vehicle having steerable front wheels, left and right rear wheels, a left brake unit for braking the left rear wheel, a right brake unit for braking the right rear wheel, and a single manually operated brake input device. The brake control system includes a main brake valve and a link which operatively couples the valve spool to the brake input device. The main brake valve includes a pilot which is connected to an outlet and which operates in opposition to the brake input device. A solenoid operated normally open left turn valve controls communication between the main brake valve and the left brake unit. A solenoid operated normally open right turn valve controls communication between the main brake valve and the right brake unit. A solenoid operated normally open balance valve controls communication between the left and right brake units.

The brake control system also includes a brake position sensor which senses a position of the brake input device, a turn angle sensor, a vehicle speed sensor, and an electronic control unit (ECU) connected to the brake position sensor, to the turn angle sensor and to the vehicle speed sensor. The ECU controls the left and right turn valves and the balance valve as a function of signals from the brake position sensor, the turn angle sensor and the vehicle speed sensor.

The ECU closes the balance valve and closes the right turn valve if vehicle speed is less than a threshold, and the signal from the turn angle sensor indicates the steerable wheels are in a right turn, and the brake input device is actuated. The the ECU closes the balance valve and closes the left turn valve if vehicle speed is less than a threshold, and the signal from the turn angle sensor indicates the steerable wheels are in a left turn, and the brake input device is actuated.

The ECU opens the balance valve and opens the left and right turn valves, if vehicle speed is not less than a speed threshold, or the vehicle is not performing a turn, or the brake input device is not actuated.

BRIEF DESCRIPTION OF THE DRAWINGS

The sole FIGURE is a schematic diagram of a vehicle brake system embodying the invention.

DETAILED DESCRIPTION OF THE DRAWINGS

Referring to the sole FIGURE, a brake control system 10 for a vehicle (not shown) having a left rear brake unit 12 which brakes a left rear wheel 13 and a right rear brake unit 14 which brakes a right rear wheel 15. The vehicle also includes steerable left and right front wheels 17 and 19. The brake control system 10 includes a single manually operated brake input device 16, such as a conventional brake pedal. The brake control system 10 also includes a main brake valve 20 which has a supply port 22 connected to a pressure source 23, a return port 24 connected to a reservoir 25, an outlet 26 and a valve spool 28 for controlling communication between the supply port 22, the return port 24, and the outlet 26. A conventional link 30 operatively couples the valve spool 28 to the brake pedal 16. Valve 20 also includes a pilot 32 and a spring 34, both of which operate in opposition to the brake pedal 16. The pilot 32 is communicated with the outlet 26.

The brake control system 10 also includes a solenoid operated normally open right turn valve 40 for controlling communication between the outlet 26 and the left brake unit 12. Valve 40 includes an inlet 42 in communication with outlet 26 and pilot 32, and an outlet 44 connected to the left brake unit 12. A spring 46 urges valve 40 to its closed position, and solenoid 48 is operable to move valve 40 to an open position. The brake control system 10 also includes a solenoid operated normally open left turn valve 50 for controlling communication between the outlet 26 and the right brake unit 14. Valve 50 includes an inlet 52 in communication with outlet 26 and pilot 32, and an outlet 54 connected to the right brake unit 14. A spring 56 urges valve 50 to its closed position, and solenoid 58 is operable to move valve 50 to an open position.

The brake control system 10 also includes a solenoid operated normally open balance valve 60 for controlling communication between the left brake unit 12 and the right brake unit 14. Valve 60 includes a port 62 in communication with the left brake unit 12 and a port 64 in communication with the right brake unit 14. A spring 66 urges valve 60 to its open position, and solenoid 68 is operable to move valve 60 to a closed position.

The brake control system 10 also includes a pedal position sensor 70 which senses the position of the brake pedal 16. The brake control system 10 also includes a turn angle sensor 72 which senses the turn angle of the front wheels 17 and 19 which are mounted to front axle 78. The turn angle sensor 72 may generate a 0 degree signal when the wheels 17 and 19 are oriented straight ahead, may generate a + degree signal when the wheels 17 and 19 are in a left turn, and may generate a – degree signal when the wheels 17 and 19 are in a right turn. The brake control system 10 also includes a vehicle speed sensor 80 which senses the speed of the vehicle (not shown).

An electronic control unit (ECU) 82 receives a brake pedal position signal from sensor 70, a turn angle signal from sensor 72 and a speed signal from sensor 80. The ECU 82 is connected to solenoids 32, 48, 58 and 68 of valves 20, 40, 50 and 60, respectively. The ECU 82 controls the left and right turn valves 40 and 50, and the balance valve 60 as a function of signals from the brake position sensor 70, the turn angle sensor 72 and the vehicle speed sensor 80.

The ECU 82 may energize the balance valve solenoid 68 to close the balance valve 60 and energizes the solenoid 48 to close the right turn valve 40 if vehicle speed is less than a threshold (such as 15 kph), and the signal from the turn angle sensor 72 is less than a right turn threshold, and the sensor 70 indicates that the pedal 16 is depressed. As a result, pressure will be applied only to the right rear brake unit 16, which assists in executing a right turn.

The ECU 82 may energize the balance valve solenoid 68 to close the balance valve 60 and energizes the solenoid 58 to close the left turn valve 50 if vehicle speed is less than a threshold (such as 15 kph), and the signal from the turn angle sensor 72 is greater than a left turn threshold, and the sensor 70 indicates that the pedal 16 is depressed. As a result, pressure will be applied only to the left rear brake unit 14.

If neither of the above conditions occurs, then the ECU 82 de-energizes the balance valve solenoid 68 to open the balance valve 60, de-energizes the solenoid 48 to open the right turn valve 40 and de-energizes the solenoid 58 to close the open the left turn valve 50, which assists in executing a left turn. In other words, the ECU opens the balance valve and opens the left and right turn valves, if vehicle speed is not less than a speed threshold, or the vehicle is not performing a turn, or the brake input device is not actuated.

Thus, in this system, a single spool brake valve normally provides a common hydraulic pressure to the right and left brake actuators on the rear axle. When the tractor is at headland speeds, typically less than 15 kph, and the operator turns the front wheel to either the right or left steering stop (measured by the front wheel angle sensor), the normally open balance valve and the associated right or left turn valve are energized and closed. In this configuration, the operator is able to apply brake pressure to only one side of the rear axle for improved headland turns. The balance valve provides redundancy in the event that one of the right or left turn valves sticks in the blocked position. The normally open balance valve disables differential braking during higher speed on-road braking.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A brake control system for a vehicle having steerable front wheels, left and right rear wheels, a left brake unit for braking the left rear wheel, a right brake unit for braking the right rear wheel, and a single manually operated brake input device, the brake control system comprising:
    a main brake valve having a supply port, a return port, an outlet and a valve spool for controlling communication between the supply port, the return port, and the outlet;
    a link which operatively couples the valve spool to the brake input device;
    a solenoid operated normally open left turn valve for controlling communication between the outlet and the left brake unit;
    a solenoid operated normally open right turn valve for controlling communication between the outlet and the right brake unit;
    a solenoid operated normally open balance valve for controlling communication between the left and right brake units;
    a brake position sensor for sensing a position of the brake input device;
    a turn angle sensor;
    a vehicle speed sensor; and
    an electronic control unit (ECU) connected to the brake position sensor, to the turn angle sensor and to the vehicle speed sensor, the ECU controlling the left and right turn valves and the balance valve as a function of signals from the brake position sensor, the turn angle sensor and the vehicle speed sensor.

2. The brake control system of claim 1, wherein:
    the ECU closes the balance valve and closes the right turn valve if vehicle speed is less than a threshold, and the signal from the turn angle sensor indicates the steerable wheels are in a right turn, and the brake input device is actuated.

3. The brake control system of claim 1, wherein:
    the ECU closes the balance valve and closes the left turn valve if vehicle speed is less than a threshold, and the signal from the turn angle sensor indicates the steerable wheels are in a left turn, and the brake input device is actuated.

4. The brake control system of claim 1, wherein:
    the ECU closes the balance valve and closes the right turn valve if vehicle speed is less than a threshold, and the signal from the turn angle sensor indicates the steerable wheels are in a right turn, and the brake input device is actuated; and
    the ECU closes the balance valve and closes the left turn valve if vehicle speed is less than a threshold, and the signal from the turn angle sensor indicates the steerable wheels are in a left turn, and the brake input device is actuated.

5. The brake control system of claim 1, wherein:
    the ECU opens the balance valve and opens the left and right turn valves, if vehicle speed is not less than a speed threshold, or the vehicle is not performing a turn, or the brake input device is not actuated.

6. The brake control system of claim 1, wherein:
    the main brake valve includes a pilot which is connected to the outlet and which operates in opposition to the brake input device.

7. The brake control system of claim 1, wherein:
    the ECU closes the balance valve and closes the right turn valve if vehicle speed is less than a threshold, and the signal from the turn angle sensor indicates the steerable wheels are in a right turn, and the brake input device is actuated;
    the ECU closes the balance valve and closes the left turn valve if vehicle speed is less than a threshold, and the signal from the turn angle sensor indicates the steerable wheels are in a left turn, and the brake input device is actuated; and
    the ECU opens the balance valve and opens the left and right turn valves, if vehicle speed is not less than a speed threshold, or the vehicle is not performing a turn, or the brake input device is not actuated.

8. A brake control system for a vehicle having steerable front wheels, left and right rear wheels, a left brake unit for braking the left rear wheel, a right brake unit for braking the right rear wheel, and a single manually operated brake input device, the brake control system comprising:
- a main brake valve having a supply port, a return port, an outlet and a valve spool for controlling communication between the supply port, the return port, and the outlet, the valve spool being operatively coupled to brake input device;
- a normally open left turn valve for controlling communication between the outlet and the left brake unit;
- a normally open right turn valve for controlling communication between the outlet and the right brake unit;
- a normally open balance valve for controlling communication between the left and right brake units;
- a brake position sensor for sensing a position of the brake input device;
- a turn angle sensor;
- a vehicle speed sensor; and
- a control unit connected to the brake position sensor, to the turn angle sensor and to the vehicle speed sensor, the control unit controlling the left and right turn valves and the balance valve as a function of signals from the brake position sensor, the turn angle sensor and the vehicle speed sensor.

9. The brake control system of claim 8, wherein:
the control unit closes the balance valve and closes the right turn valve if vehicle speed is less than a threshold, and the signal from the turn angle sensor indicates the steerable wheels are in a right turn, and the brake input device is actuated.

10. The brake control system of claim 8, wherein:
the control unit closes the balance valve and closes the left turn valve if vehicle speed is less than a threshold, and the signal from the turn angle sensor indicates the steerable wheels are in a left turn, and the brake input device is actuated.

11. The brake control system of claim 8, wherein:
the control unit closes the balance valve and closes the right turn valve if vehicle speed is less than a threshold, and the signal from the turn angle sensor indicates the steerable wheels are in a right turn, and the brake input device is actuated; and
the control unit closes the balance valve and closes the left turn valve if vehicle speed is less than a threshold, and the signal from the turn angle sensor indicates the steerable wheels are in a left turn, and the brake input device is actuated.

12. The brake control system of claim 8, wherein:
the control unit opens the balance valve and opens the left and right turn valves, if vehicle speed is not less than a speed threshold, or the vehicle is not performing a turn, or the brake input device is not actuated.

13. The brake control system of claim 8, wherein:
the main brake valve includes a pilot which is connected to the outlet and which operates in opposition to the brake input device.

14. The brake control system of claim 8, wherein:
the control unit closes the balance valve and closes the right turn valve if vehicle speed is less than a threshold, and the signal from the turn angle sensor indicates the steerable wheels are in a right turn, and the brake input device is actuated;
the control unit closes the balance valve and closes the left turn valve if vehicle speed is less than a threshold, and the signal from the turn angle sensor indicates the steerable wheels are in a left turn, and the brake input device is actuated; and
the control unit opens the balance valve and opens the left and right turn valves, if vehicle speed is not less than a speed threshold, or the vehicle is not performing a turn, or the brake input device is not actuated.

* * * * *